Patented Sept. 6, 1932

1,876,076

UNITED STATES PATENT OFFICE

BEN W ROWLAND, OF AKRON, OHIO, ASSIGNOR TO THE GOODYEAR TIRE & RUBBER COMPANY, OF AKRON, OHIO, A CORPORATION OF OHIO

METHOD OF TREATING TIRE BEAD

No Drawing. Application filed July 27, 1929. Serial No. 381,672.

This invention relates to a method of treating units of material which are to be incorporated into rubber articles, and it has particular relation to a method of imparting tackiness or adhesiveness to the surfaces of such articles.

One object of the invention is to provide a method of treating the surfaces of articles whereby to render them tacky or adhesive for relatively long periods of time.

Another object of the invention is to provide a non-inflammable dipping cement for use in the manufacture of rubber goods.

In the manufacture of rubber articles, it is frequently desirable to coat the surfaces of the various plies of material with a tacky substance which will insure adhesion therebetween when the plies are brought into contact with each other. Heretofore, cements consisting of ordinary rubber dissolved in benzene, gasoline or other similar organic solvents, have been employed for this purpose. Unfortunately, these solvents are highly volatile and also highly inflammable. For that reason, the fire hazard involved in their use is very great. Also, the solvents in such compounds tend to evaporate quickly when the materials are spread upon the surfaces to be treated. Therefore, the treated surfaces quickly lose their tacky nature. Accordingly, supplies of coated material cannot be stored for any great length of time prior to their incorporation into the finished articles for which they are designed.

This invention consists in the provision of an adhesive cement consisting essentially of latex intermixed with a small amount of pine tar, together with any other minor ingredients which special circumstances may render desirable. A coating composition which has been found particularly useful for dipping or coating fabric covered pneumatic tire beads prior to their incorporation into tire carcasses may be prepared in the following manner.

Emulsify 60 cc. of pine tar oil with approximately 75 cc. of a dilute soap solution, together with 40 cc. of a pine oil (preferably oxidized), and incorporate this mixture into 500 cc. of ordinary ammonia preserved latex having a concentration of approximately 80 per cent of rubber. In the preparation of this compound a pine tar of relatively viscous nature should be employed. In making determinations of the viscosity of the tar, a viscosimeter of the Stormer type disclosed on page 687 of Catalog C227 of The Central Scientific Company (copyrighted in 1927), may be employed. A test cup having no central baffle, such as the one bearing catalog No. 14,185 should be used in the determination. The tar should be of such viscosity as to permit approximately three revolutions per minute of the revolving cylinder of the viscosimeter when a weight of 200 grams is attached to the actuating cord.

Substantially any oxidized pine oil may be employed in the composition, a typical example of one such oil being the material sold under the trade name of "Hercosol #80", which is prepared by the Hercules Powder Company, of Wilmington, Delaware.

The various ingredients are thoroughly agitated in order to insure complete emulsification thereof, after which they are ready for use in coating substantially any material to which it is desirable to impart a tacky or sticky surface.

As previously intimated, the compound has been found to be particularly useful in the treatment of the non-extensible grommets employed as beads in the manufacture of pneumatic tires. The beads may be coated merely by dipping them into a bath of the latex compound and then permitting them to drain. Beads so treated may be kept in storage for several days without losing their tackiness. In case they become somewhat dry it is merely necessary to moisten them with benzene or gasoline to restore them to substantially their original condition.

The cost of such materials is extremely low, because the principal ingredient consists of latex in substantially the condition in which it is obtained from the rubber plantations. The other ingredients are also comparatively inexpensive. Also, the pine tar and the pine oil are practically non-inflammable when incorporated into such aqueous emulsions as latex. Therefore, the fire hazard involved in the use of the new cements is practically nil.

Although I have described in detail only the preferred forms which the invention may assume, it will be apparent to those skilled in the art that the invention is not so limited, but that various modifications may be made therein without departing from the spirit of the invention or from the scope of the appended claims.

What I claim is:

1. A method of treating the beads of pneumatic tires prior to their incorporation into the tires which comprises coating them with a mixture of latex, oxidized pine oil and pine tar having such viscosity as to permit approximately three revolutions per minute of the revolving cylinder of a Stormer viscosimeter when the latter is actuated by a weight of 200 grams.

2. A bead for a pneumatic tire which has been coated with a mixture comprising 500 cc. of ammonia preserved latex, 60 cc. of pine tar and 40 cc. of oxidized pine oil.

3. A method of treating beads for pneumatic tires prior to incorporation into such tires which comprises coating them with a mixture of latex, oxidized pine oil and pine tar.

4. A method of treating beads for pneumatic tires prior to incorporation into such tires which comprises coating them with a mixture embodying, by volume, 25 parts of ammoniacal latex, 3 parts pine tar and 2 parts of oxidized pine oil.

5. A pneumatic tire bead that has been coated with a mixture comprising as ingredients latex, oxidized pine oil and pine tar having such viscosity as to permit approximately three revolutons per minute of the revolving cylinder of a Stormer viscosimeter when the latter is actuated by weight of 200 grams.

In witness whereof, I have hereunto signed my name at Akron, in the county of Summit and State of Ohio, U. S. A., this 26th day of July, 1929.

BEN W ROWLAND.